(12) United States Patent
Yuan

(10) Patent No.: US 10,013,133 B2
(45) Date of Patent: Jul. 3, 2018

(54) TOUCH DISPLAY PANEL INCLUDING TOUCH SENSING ELECTRODE AND METHOD FOR DRIVING TOUCH DISPLAY PANEL

(71) Applicants: Shanghai Tianma Micro-Electronics Co., Ltd., Shanghai (CN); Tianma Micro-Electronics Co., Ltd., Shenzhen (CN)

(72) Inventor: Yong Yuan, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 143 days.

(21) Appl. No.: 15/019,961

(22) Filed: Feb. 9, 2016

(65) Prior Publication Data

US 2017/0068360 A1    Mar. 9, 2017

(30) Foreign Application Priority Data

Sep. 7, 2015    (CN) .......................... 2015 1 0562935

(51) Int. Cl.
G06F 3/045 (2006.01)
G06F 3/047 (2006.01)
G06F 3/041 (2006.01)
G06F 3/044 (2006.01)

(52) U.S. Cl.
CPC ............ *G06F 3/047* (2013.01); *G06F 3/0412* (2013.01); *G06F 3/0416* (2013.01); *G06F 3/044* (2013.01); *G06F 2203/04103* (2013.01)

(58) Field of Classification Search
CPC ........ G06F 3/044; G06F 3/047; G06F 3/0412; G06F 3/0416
USPC ........................................ 345/174; 178/18.06
See application file for complete search history.

(56) References Cited

U.S. PATENT DOCUMENTS

| 7,605,899 B2 | 10/2009 | Shikina et al. | |
| 2008/0309627 A1* | 12/2008 | Hotelling | G06F 3/044 345/173 |
| 2011/0050585 A1* | 3/2011 | Hotelling | G06F 3/044 345/173 |

(Continued)

FOREIGN PATENT DOCUMENTS

| CN | 104166489 A | 11/2014 |
| CN | 104699352 A | 6/2015 |
| CN | 104820321 A | 8/2015 |

*Primary Examiner* — Adam J Snyder
(74) *Attorney, Agent, or Firm* — Faegre Baker Daniels LLP

(57) ABSTRACT

A touch display panel and a method for driving the touch display panel. The touch display panel including: a substrate; first scan lines and data lines; sub-pixels arranged in an array; touch sensing electrodes disposed in an array, each of which corresponds to the sub-pixels; first control switches, wherein each of the touch sensing electrodes is connected to at least one of the data lines via one of the first control switches. When in a touch state, the first control switch is turned on, so that the at least one of the data lines is configured to provide a touch signal to the touch sensing electrode corresponding to the data lines; and when in a display state, the first control switch is turned off, so that each of the data lines is configured to provide a display signal to the sub-pixel corresponding to the data line.

18 Claims, 13 Drawing Sheets

(56) References Cited

U.S. PATENT DOCUMENTS

| | | | |
|---|---|---|---|
| 2012/0038585 A1* | 2/2012 | Kim | G06F 3/044 345/174 |
| 2012/0218199 A1 | 8/2012 | Kim et al. | |
| 2013/0050130 A1* | 2/2013 | Brown | G06F 3/044 345/174 |
| 2013/0141343 A1* | 6/2013 | Yu | G06F 3/0412 345/173 |
| 2015/0177880 A1* | 6/2015 | Shin | G06F 3/044 345/174 |
| 2016/0041664 A1* | 2/2016 | Qin | G06F 3/044 345/173 |

* cited by examiner

TOUCH DISPLAY PANEL INCLUDING TOUCH SENSING ELECTRODE AND METHOD FOR DRIVING TOUCH DISPLAY PANEL

CROSS-REFERENCE TO RELATED APPLICATION

This application claims priority to Chinese Application No. 201510562935.3, filed Sep. 7, 2015, which is herein incorporated by reference in its entirety.

BACKGROUND

In the field of display technologies, to make a display panel thinner and lighter, it is increasingly popular to integrate display and touch sensing functions onto the same display panel, leading to the integration of a display unit and a touch unit in an In-Cell mode or an On-Cell mode, where the In-Cell mode refers to integration of the touch unit into the display panel, and the On-Cell mode refers to that the touch unit is independent of the display panel.

FIG. 1A is a schematic diagram showing a touch display panel in the related art. As shown in FIG. 1A, the touch display panel includes at least a driving circuit (not shown), a plurality of touch sensing electrodes 11, a plurality of scan lines 12 and a plurality of data lines 13. A plurality of sub-pixels 14 arranged in an array are defined by the plurality of scan lines 12 and the plurality of data lines 13 intersecting the scan lines 12, where each of the sub-pixels 14 is electrically connected with corresponding one of the data lines 13 via a control switch 15. Each of the touch sensing electrodes 11 may correspond to a plurality of the sub-pixels 14, and is electrically connected to a metal wiring 17 by a via hole 16. During a display phase of the touch display panel, a common voltage signal Vcom is applied to each of the touch sensing electrodes 11 through the corresponding metal wiring 17, and the driving circuit applies a scan signal to each of the scan lines 12 to scan a corresponding row of the sub-pixels 14 through the scan line 12 and hence turn on the control switches 15, and meanwhile applies data signals to the data lines 13 so that the data signals are transmitted to the sub-pixels 14 by the data lines 13, thereby driving the entire touch display panel to display an image. During a touch sensing phase of the touch display panel, the driver circuit stops provision of the scan signals and the data signals to the scan lines 12 and the data lines 13, i.e. the electrical connections of the scan lines 12 and the data lines 13 to the sub-pixels 14 are disconnected, and meanwhile a touch driving signal is provided to each of the touch sensing electrodes 11 via the metal wiring 17 to sense a position of a touch conducted by a user on the touch display panel, in order to achieve the touch sensing function.

FIG. 1B is a cross-sectional view of the touch display panel along a line A-A in FIG. 1A. As shown in FIG. 1B, the touch sensing electrode 11 is electrically connected with the metal wiring 17 by the via hole 16. The metal wiring 17 is configured to provide the touch sensing electrode 11 with the common voltage signal during the display phase, and provides the touch sensing electrode 11 with the touch driving signal during the touch sensing phase. Therefore, an additional process is required in manufacturing to form the metal wiring 17, and furthermore the via hole 16 is required for the electrical connection of the metal wiring 17 with the touch sensing electrode 11, resulting in complicated processes of manufacturing the touch display panel and an increased number of the processes, thereby significantly increasing the manufacturing cost. Additionally, the added metal wirings 17 further cause the uneven surface of the sub-pixel region, thereby affecting the display effect and increasing the risk of light leakage.

SUMMARY

The present disclosure provides a touch display panel and a method for driving the touch display panel, in order to solve the problem in the related art.

In a first example, embodiments of the disclosure provide a touch display panel, and the touch display panel includes:
  a substrate;
  a plurality of first scan lines and a plurality of data lines both disposed on the substrate;
  a plurality of sub-pixels arranged in an array, which are defined by the data lines and the scan lines insulatedly intersecting the data lines;
  a plurality of touch sensing electrodes disposed in an array, each of which corresponds to a plurality of the sub-pixels;
  a plurality of first control switches, where each of the touch sensing electrodes is connected to at least one of the data lines via one of the first control switches; where
  when the touch display panel is in a touch state, the first control switch is turned on, so that the at least one of the data lines is configured to provide a touch signal to the touch sensing electrode corresponding to the at least one of the data lines; and
  when the touch display panel is in a display state, the first control switch is turned off, so that each of the data lines is configured to provide a display signal to the sub-pixel corresponding to the data line.

In a second example, embodiments of the disclosure provide a method for driving the touch display panel, where the touch display panel includes:
  a substrate;
  a plurality of first scan lines and a plurality of data lines both disposed on the substrate;
  a plurality of sub-pixels arranged in an array, which are defined by the data lines and the scan lines insulatedly intersecting the data lines;
  a plurality of touch sensing electrodes disposed in an array, each of which corresponds to a plurality of the sub-pixels; and
  a plurality of first control switches, where each of the touch sensing electrodes is connected to at least one of the data lines via one of the first control switches;
  the method includes:
  generating a touch enabling signal to turn on the first control switch when the touch display panel is in a touch state, so that the at least one of the data lines provides a touch signal to the touch sensing electrode corresponding to the at least one of the data lines and the sub-pixel is electrically insulated from the data line corresponding to the sub-pixel; and
  generating a touch disabling voltage signal to turn off the first control switch when the touch display panel is in a display state, so that each of the data lines is electrically insulated from the touch sensing electrode corresponding to the data line and the data line provides a display signal to the sub-pixel corresponding to the data line.

In embodiments of the disclosure, the touch sensing electrode is electrically connected with the corresponding data line by the first control switch. When the touch display panel is in a touch state, the first control switch is turned on so that a touch signal (e.g. a touch driving signal) is provided to the corresponding touch sensing electrode via the data line; and when the touch display panel is in a display state, the first control switch is turned off so that a display signal is provided to the corresponding sub-pixel via the data line. In this configuration, the existing data line is utilized to provide the touch signal to the touch sensing electrode, without adding additional wirings to the display region, thereby not only reducing the processes of manufacturing the touch display panel to lower the cost of the touch display panel, but also improving planarization of the sub-pixel region to decrease the risk of light leakage. Additionally, the data line is utilized to provide the touch signal to the touch sensing electrode during the touch sensing phase and provide the display signal to the sub-pixel during the display phase, so that the touch sensing electrode is not limited by the size of the touch display panel. Furthermore, since additional metal wiring for providing the touch signal is eliminated, pins of the drive chip may also be reduced.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions in the embodiments of the disclosure or the related art, the drawings used for the description of the embodiments and the related art are briefly introduced below. The drawings for the following description only show some embodiments of the disclosure, and other drawings may be obtained from the described drawings by those skilled in the art without any creative work.

Figure 1A:
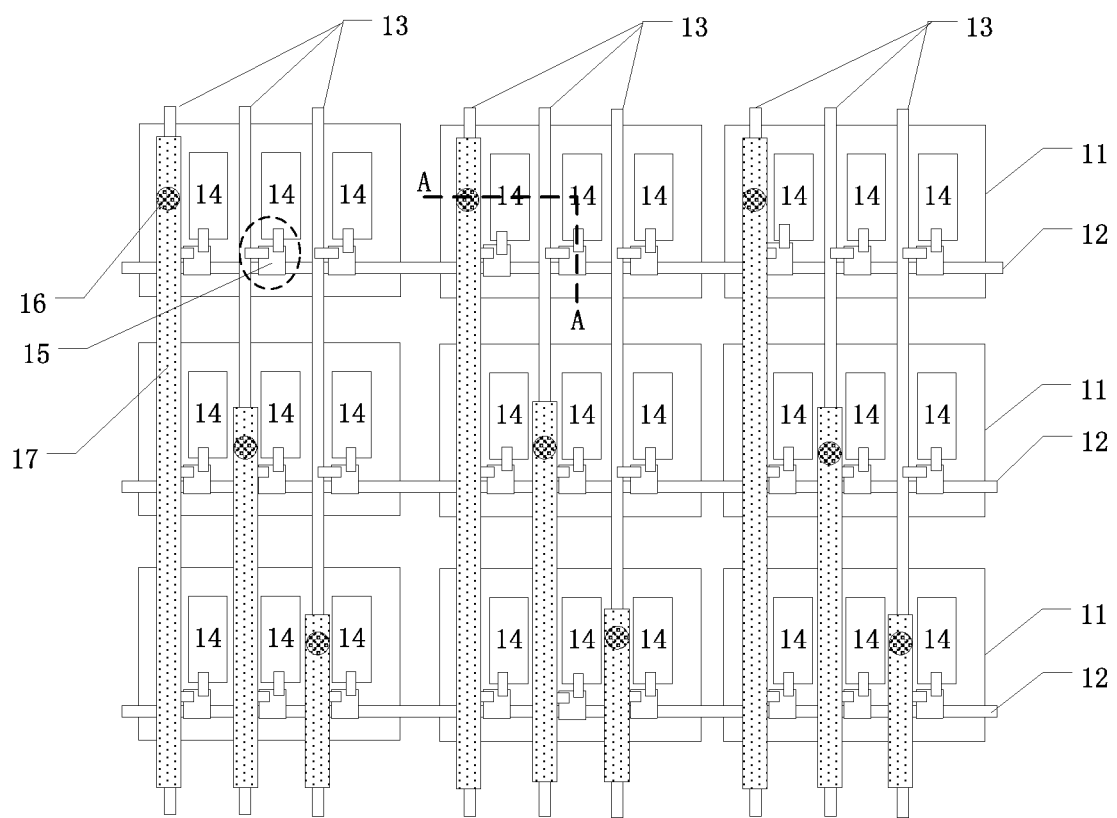
FIG. 1A is a schematic diagram showing a touch display panel in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solutions of the disclosure are clearly and completely described below in combination with the drawings of the embodiments of the disclosure. Obviously, the described embodiments are some instead of all embodiments of the disclosure. All other embodiments obtained in light of the described embodiments of the disclosure by those skilled in the art without any creative work should fall within the protection scope of the disclosure.

Figure 2A:
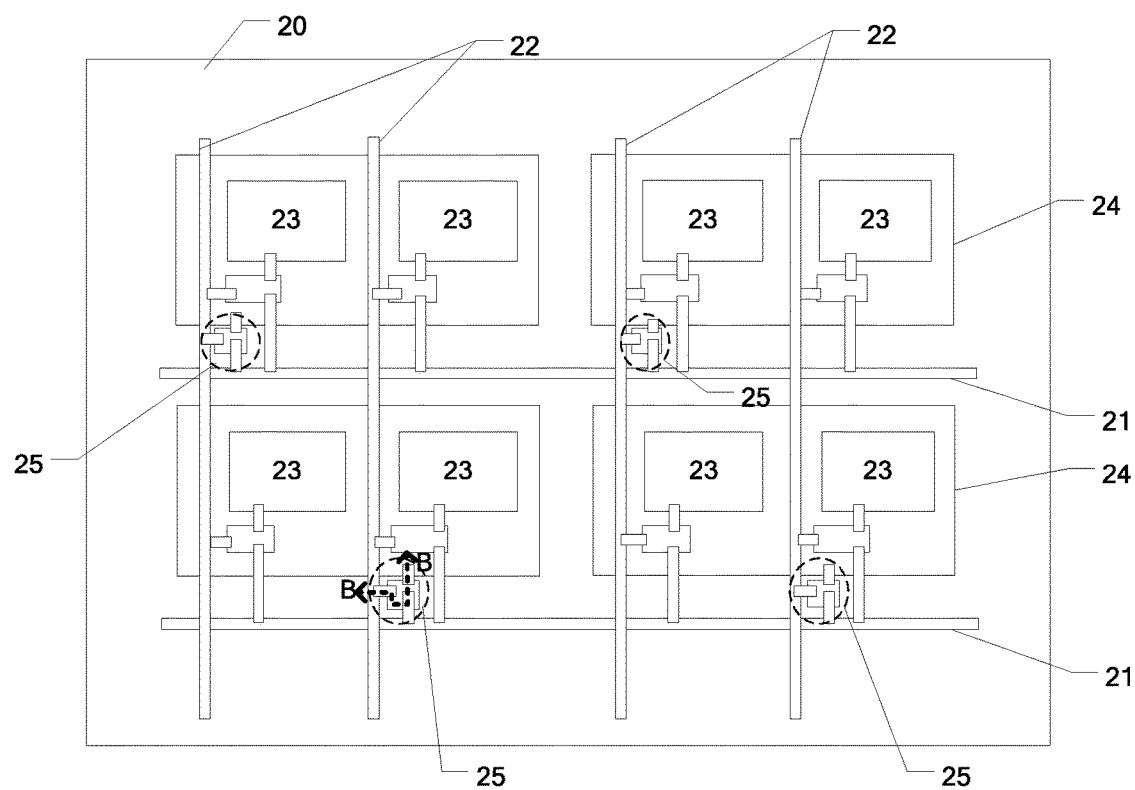
FIG. 2A is a schematic diagram showing the structure of a touch display panel, according to embodiments of the disclosure.

The disclosure provides a touch display panel. FIG. 2A is a schematic diagram showing the structure of a touch display panel, according to embodiments of the disclosure. As shown in FIG. 2A, the touch display panel includes: a substrate 20; a plurality of first scan lines 21 and a plurality of data lines 22 disposed on the substrate 20; a plurality of sub-pixels 23 arranged in an array (illustratively, sub-pixels 23 arranged in an array having two rows and four columns are shown in FIG. 2A), which are defined by the data lines 22 and the scan lines 21 insulatedly intersecting the data lines 22; a plurality of touch sensing electrodes 24 disposed in an array (illustratively, touch sensing electrodes 24 arranged in an array having two rows and two columns are shown in FIG. 2A), each of which corresponds to a plurality of the sub-pixels 23 (illustratively, each of the touch sensing electrodes 24 corresponds to two sub-pixels 23 as shown in FIG. 2A); and a plurality of first control switches 25, where each of the touch sensing electrodes 24 is connected to at least one of the data lines 22. FIG. 2A illustratively shows that each of the touch sensing electrodes 24 is connected to the data line 22 corresponding thereto by the corresponding first control switch 25. When the touch display panel is in a touch state, the first control switch 25 is turned on, so that a touch signal is provided by at least one of the data lines 22 to the touch sensing electrode 24 corresponding thereto; and when the touch display panel is in a display state, the first control switch 25 is turned off, so that a display signal is provided by each of the data lines 22 to the sub-pixels 23 corresponding thereto.

Figure 2B:
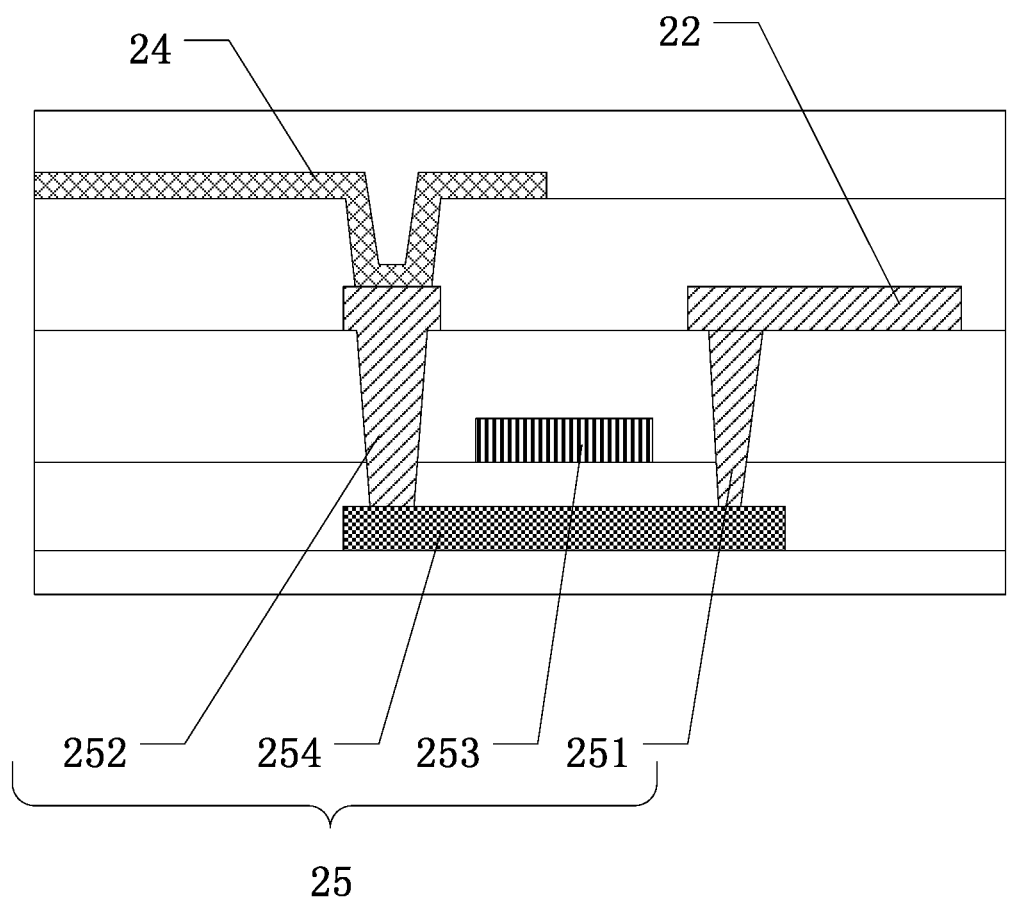
FIG. 2B is a cross-sectional view of the touch display panel along a line B-B in FIG. 2A.

FIG. 2B is a cross-sectional view of the touch display panel along a line B-B in FIG. 2A. As shown in FIG. 2B, the first control switch 25 as a TFT (thin film transistor) includes a source electrode 251, a drain electrode 252, a gate electrode 253 and a semiconductor layer 254. The first control switch 25 is illustratively shown in FIG. 2B to have a top-gate TFT structure, but the disclosure is not limited thereto. In other embodiments, the first control switch 25 may have a bottom-gate TFT structure. The source electrode 251 of the first control switch 25 is connected to the data line 22, and the drain electrode 252 of the first control switch 25 is connected to the touch sensing electrode 24. The first control switch 25 may have a Low Temperature Poly-Silicon-Thin Film Transistor (LTPS-TFT) structure, i.e. the semiconductor layer 254 of the first control switch 25 is made of poly silicon, so that the first control switch 25 has a fast response speed. An amorphous silicon film may be transformed into a poly silicon film by an Excimer Laser Annealing process, a Metal optimization Crystallization process or a Solid Phase Crystallization process. The semiconductor layer 254 may be made of oxide semiconductor or amorphous silicon.

The gate electrode 253 of the first control switch 25 is disposed in the same layer as the first scan line 21 (not shown in FIG. 2B). It is noted that the source electrode 251 and the drain electrode 252 of the first control switch 25 are exchangeable, i.e. it is alternatively possible that the source electrode 251 of the first control switch 25 is connected to the touch sensing electrode 24 and the drain electrode 252 of the first control switch 25 is connected to the data line 22. It is noted that, although FIGS. 2A and 2B illustratively show that a turning-on signal for the first control switch 25 is provided by the first scan line 21, i.e. the gate electrode 253 of the first control switch 25 is connected with the first scan line 21, the turning-on signal for the first control switch 25 may be alternatively provided by other external signal line in other embodiments, which is not limited in the embodiments of the disclosure.

As such, in embodiments of the disclosure, the touch sensing electrode is electrically connected with the corresponding data line by the first control switch. When the touch display panel is in a touch state, the first control switch is turned on so that a touch signal (e.g. a touch driving signal) is provided to the corresponding touch sensing electrode via the data line; and when the touch display panel is in a display state, the first control switch is turned off so that a display signal is provided to the corresponding sub-pixel via the data line. In this configuration, the existing data line is utilized to provide the touch signal to the touch sensing electrode, without adding additional wirings to the display region, thereby not only reducing the processes of manufacturing the touch display panel to lower the cost of the touch display panel, but also improving planarization of the sub-pixel region to decrease the risk of light leakage. Additionally, the data line is utilized to provide the touch signal to the touch sensing electrode during the touch sensing phase and provide the display signal to the sub-pixel during the display phase, so that the touch sensing electrode is not limited by the size of the touch display panel. Furthermore, since additional metal wiring for providing the touch signal is eliminated, pins of the drive chip may also be reduced.

It is noted that, there are various ways of implementing that the data line of the touch display panel is utilized to provide the touch signal during the touch sensing phase and provide the display signal during the display phase. Embodiments of these ways are described in detail below.

To achieve the display function, the touch display panel provided by embodiments of the disclosure includes a common electrode, which may be a planar electrode or alternatively be formed by the plurality of touch sensing electrodes described above. In the case that the common electrode of the touch display panel includes the plurality of touch sensing electrodes, the touch sensing electrodes may be reused as the common electrode for the display function. In other words, the common electrode is divided into the plurality of touch sensing electrodes. Such configuration is advantageous in that: the thickness of the touch display panel can be further decreased, and the manufacturing processes are reduced, the cost is saved and production efficiency is improved because the touch sensing electrodes are reused as the common electrode.

Figure 3A:
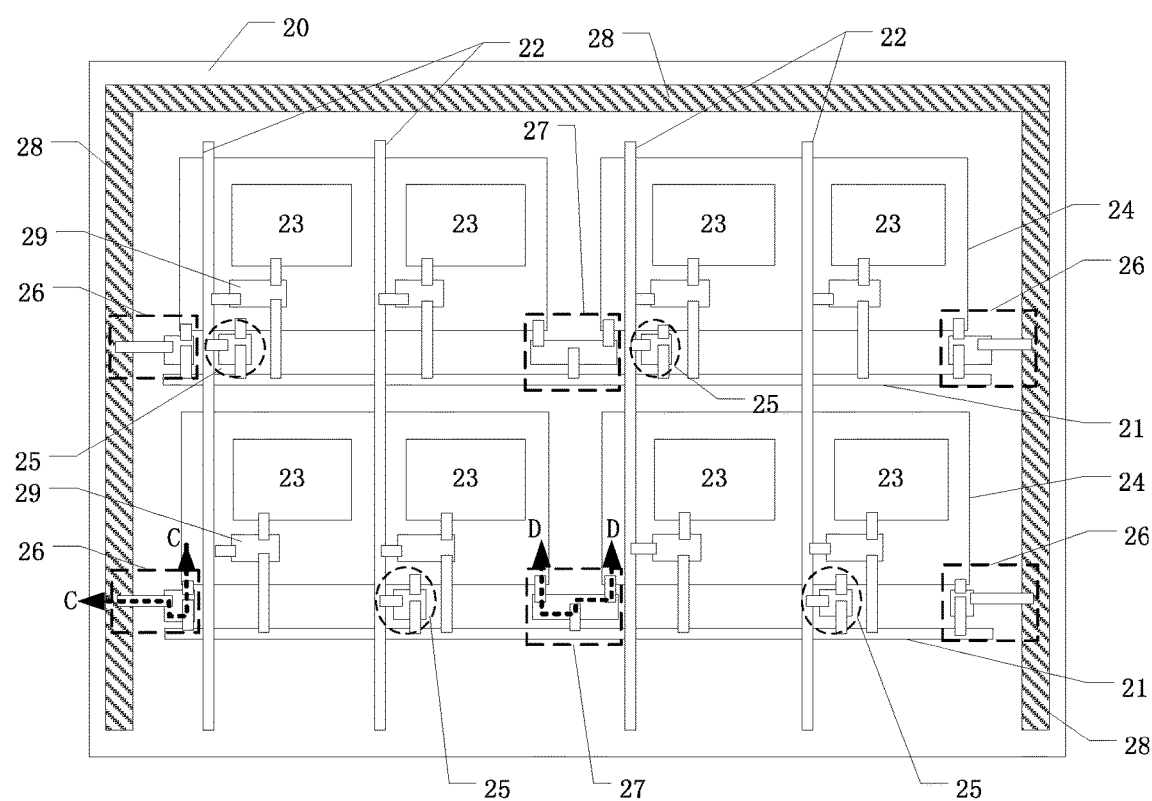
FIG. 3A is a schematic diagram showing the structure of another touch display panel, according to embodiments of the disclosure.
Figure 3B:
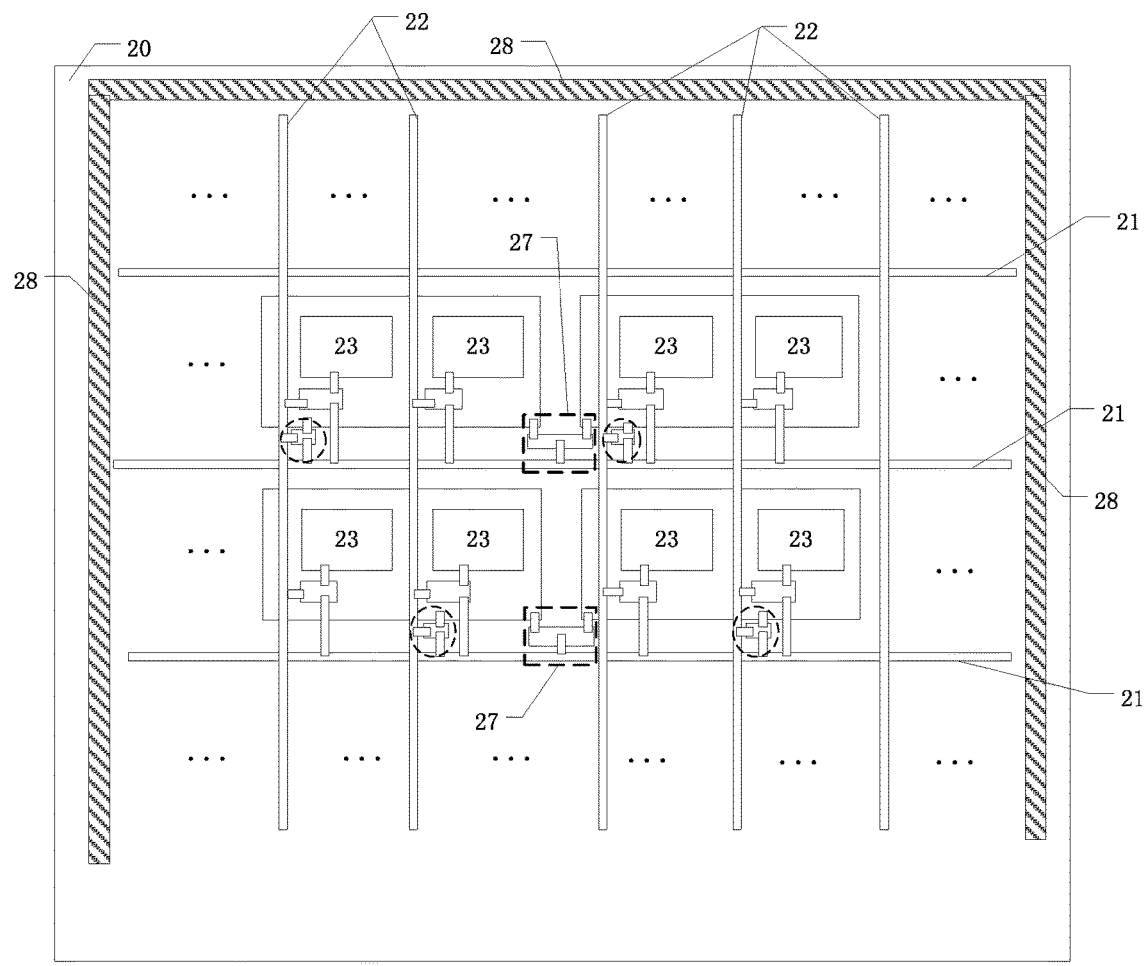
FIG. 3B is a schematic diagram showing the structure of another touch display panel, according to embodiments of the disclosure.

In the case that the touch sensing electrodes may be reused as the common electrode, the data line is utilized to provide a touch signal to the touch sensing electrode when the touch display panel is in the touch state, and the data line is utilized to provide a common voltage signal to the touch display panel when the touch display panel is in the display state. FIG. 3A is a schematic diagram showing the structure of another touch display panel according to embodiments of the disclosure, where the touch display panel is suitable for the case that the touch sensing electrodes may be reused as the common electrode. As shown in FIG. 3A, the touch display panel in FIG. 3A is different from that in FIG. 2A by further including second control switches 26 and 27 (as represented in dashed rectangles shown in FIG. 3A) and a first common electrode wiring 28. Each of the touch sensing electrodes 24 is connected to the first common electrode wiring 28 through at least one of the second control switches 26 and 27. When the touch display panel is in the display state, the second control switches 26 and 27 are turned on, so that the first common electrode wiring 28 provides the same electric potential as a common voltage to each of the touch sensing electrodes 24; and when the touch display panel is in the touch state, the second control switches 26 and 27 are turned off, so that the first common electrode wiring 28 is electrically insulated from each of the touch sensing electrodes 24. It is noted that the connection of the touch sensing electrode 24 to the first common electrode wiring 28 through at least one of the second control switches 26 and 27 may be a direct electrical connection or an indirect electrical connection. For example, the touch sensing electrode 24 near the first common electrode wiring 28 may be directly electrically connected to the first common electrode wiring 28 by the second control switch 26, while the touch sensing electrode 24 at a center region of the touch display panel may be connected to the first common electrode wiring 28 via an indirect connection, i.e. a connection to an adjacent touch sensing electrode 24 by the second control switch 27, to receive the same electric potential at the first common electrode wiring 28 as the common voltage. In other words, at least a portion of the second control switches are connected between the touch sensing electrodes and the first common electrode wiring, and at least another portion of the second control switches are connected between at least two adjacent touch sensing electrodes, as long as it is ensured that each of the touch sensing electrodes is connected to the first common electrode wiring by at least one of the second control switches. The touch sensing electrodes are illustratively disposed in an array having two rows and two columns in FIG. 3A, and hence each of the touch sensing electrodes 24 is near the first common electrode wiring 28, i.e. each of the touch sensing electrodes 24 may be directly connected with the first common electrode wiring 28 via the second control switch 26. It is also possible that the second control switch 27 is additionally provided to connect a touch sensing electrode with the adjacent touch sensing electrode 24 in order to obtain the same electric potential. As shown in FIG. 3B, in the case that the touch display panel includes a plurality of touch sensing electrodes arranged in an array having m rows and n columns (where m and n are positive integers larger than or equal to 3), the touch sensing electrode at the center region of the touch display panel cannot be directly electrically connected with the first common electrode wiring 28, and needs to be electrically connected to its adjacent touch sensing electrode 24 through the added second control switch 27 as shown in FIG. 3A to be eventually connected to the first common electrode wiring 28, so as to receive the common voltage from the first common electrode wiring.

Figure 3C:
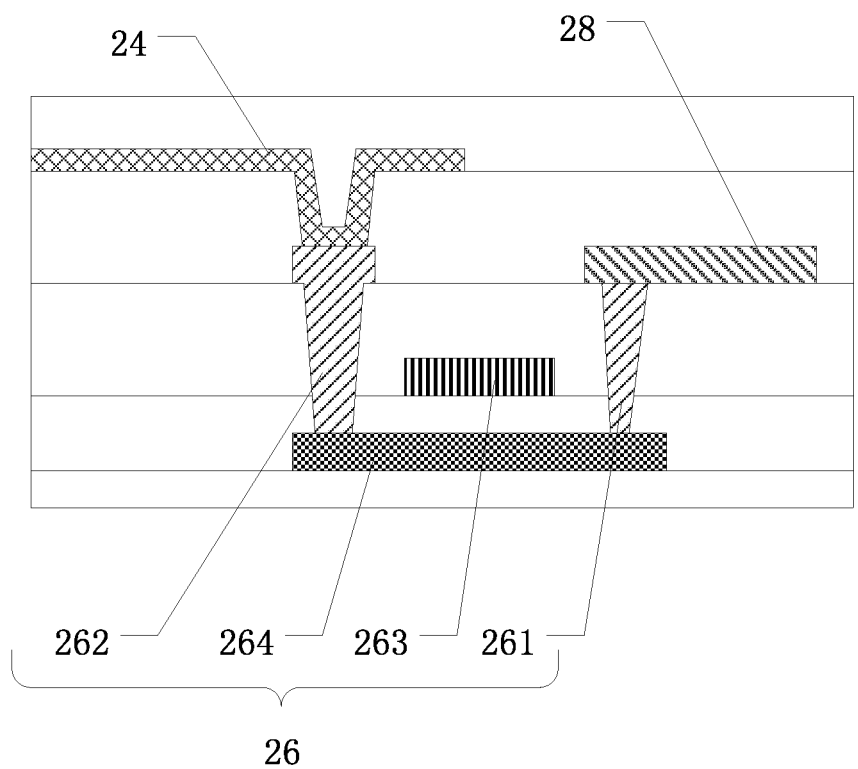
FIG. 3C is a cross-sectional view of the touch display panel along a line C-C in FIG. 3A.
Figure 3D:
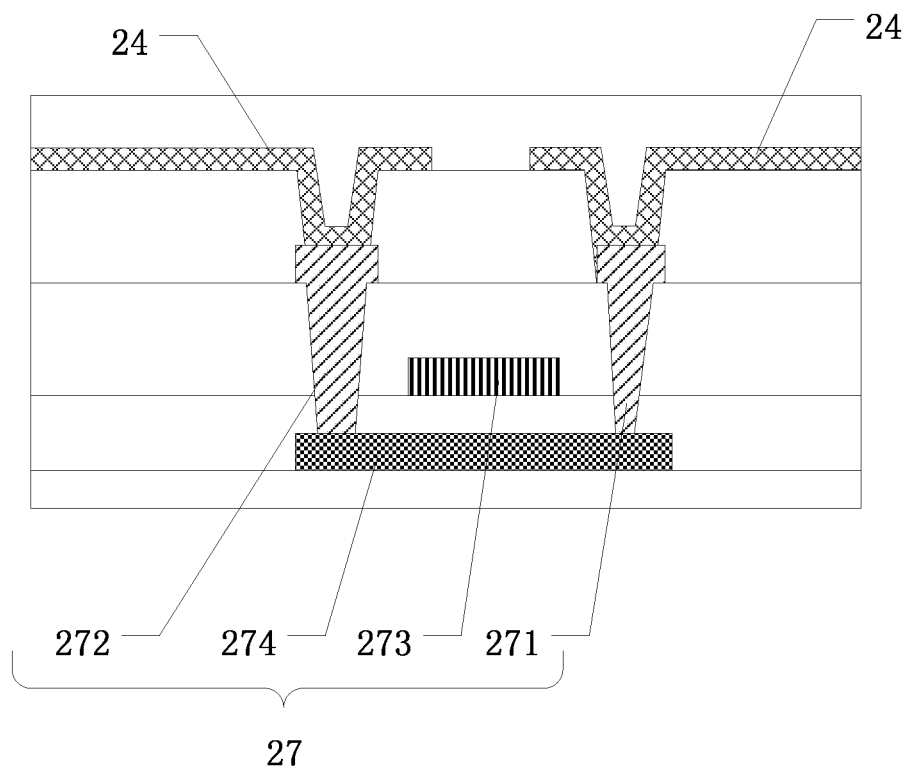
FIG. 3D is a cross-sectional view of the touch display panel along a line D-D in FIG. 3A.

FIG. 3C is a cross-sectional view of the touch display panel along a line C-C in FIG. 3A, and FIG. 3D is a cross-sectional view of the touch display panel along a line D-D in FIG. 3A. As shown in FIG. 3C, the second control switch 26 as a TFT (thin film transistor) includes a source electrode 261, a drain electrode 262, a gate electrode 263 and a semiconductor layer 264. Illustratively, the second control switch 26 is shown in FIG. 3C to have a top-gate TFT structure, but the disclosure is not limited thereto. In other embodiments, the second control switch 26 may alternatively have a bottom-gate TFT structure. The source electrode 261 of the second control switch 26 is connected to the first common electrode wiring 28, and the drain electrode 262 of the second control switch 26 is connected to the touch sensing electrode 24. The second control switch 26 can have an LTPS-TFT structure, i.e. the semiconductor layer 264 of the second control switch 26 is made of poly silicon, so that the second control switch 26 has a fast response speed. An amorphous silicon film may be transformed into a poly silicon film by an Excimer Laser Annealing process, a Metal optimization Crystallization process or a Solid Phase Crystallization process. The semiconductor layer 264 may be made of oxide semiconductor or amorphous silicon.

The gate electrode 263 of the second control switch 26 is disposed in the same layer as the first scan line 21 (not shown in FIG. 3C). It is noted that the source electrode 261 and the drain electrode 262 of the second control switch 26 are exchangeable, i.e. it is alternatively possible that the source electrode 261 of the second control switch 26 is connected to the touch sensing electrode 24 and the drain electrode 262 of the second control switch 26 is connected to the first common electrode wiring 28.

As shown in FIG. 3D, the second control switch 27 includes a source electrode 271, a drain electrode 272, a gate electrode 273 and a semiconductor layer 274. Illustratively, the second control switch 27 is shown in FIG. 3D to have a top-gate TFT structure, but the disclosure is not limited thereto. In other embodiments, the second control switch may alternatively have a bottom-gate TFT structure. Both the source electrode 271 and the drain electrode 272 of the second control switch 27 are connected to the touch sensing electrodes 24. The second control switch 27 can have an LTPS-TFT (low temperature poly-silicon thin film transistor) structure, i.e. the semiconductor layer 274 of the second control switch 27 is made of poly silicon, and hence the second control switch 27 has a fast response speed. An amorphous silicon film may be transformed into a poly silicon film by an Excimer Laser Annealing process, a Metal optimization Crystallization process or a Solid Phase Crystallization process. The semiconductor layer 274 may be made of oxide semiconductor or amorphous silicon.

The gate electrode 273 of the second control switch 27 is disposed in the same layer as the first scan line 21 (not shown in FIG. 3D).

It is noted that turning-on signals for the first control switch 25 and the second control switches 26 and 27 shown in FIGS. 3A to 3D are illustratively provided by the first scan line 21. That is, the gate electrode 253 of the first control switch 25 and the gate electrodes 263 and 273 of the second control switches 26 and 27 are each connected with the first scan line 21. In other embodiments, the turning-on signals for the first control switch 25 and the second control switches 26 and 27 may alternatively be provided by other signal line, which is not limited in the disclosure.

It is noted that a turning-on condition of the first control switch is required to be opposite to that of the second control switch in the case that the turning-on signals for the first control switch and the second control switches are provided by the same signal line (for example, the first scan line), to ensure that the second control switches are turned on when the touch display panel is in the display state, so that the same electric potential is provided to each of the touch sensing electrodes by the first common electrode wiring; and the second control switch is turned off when the touch display panel is in the touch state, so that the first common electrode wiring is electrically insulated from each of the touch sensing electrodes.

Figure 4:
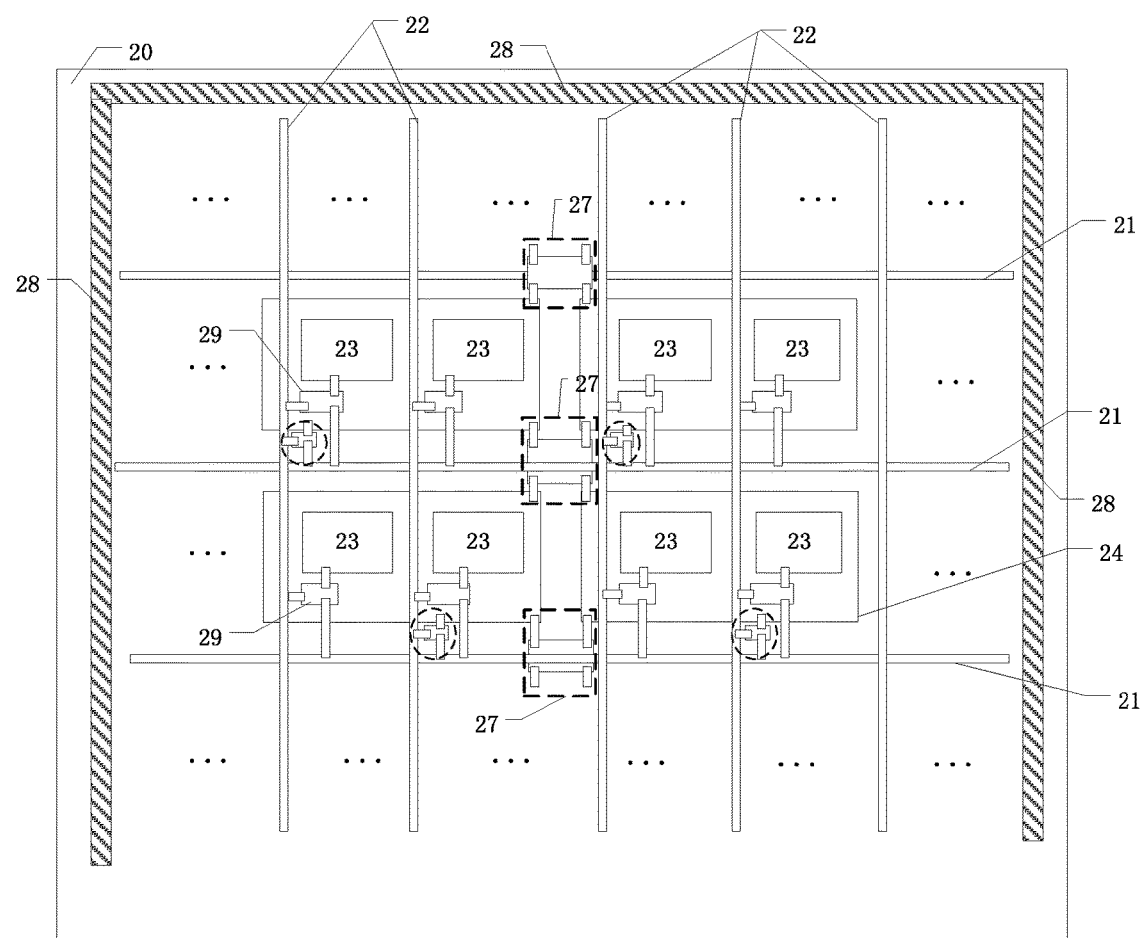
FIG. 4 is a schematic diagram showing the structure of a further touch display panel, according to embodiments of the disclosure.

FIG. 4 is a schematic diagram showing the structure of a touch display panel, according to embodiments of the disclosure. As shown in FIG. 4, each sub-pixel 23 of the touch display panel includes at least one third control switch 29, and a turning-on condition of the third control switch 29 is the same as that of the second control switches 26 and 27. Further, the turning-on condition of the first control switch 25 is opposite to that of the second control switches 26 and 27. In such configuration, the turning-on signals can be provided to the third control switch 29 and the second control switches 26 and 27 through the same signal line. For example, the first scan signal 21 is utilized to provide turning-on signals to the first control switch 25, the second control switches 26 and 27 and the third control switch 29, so that when the touch display panel is in the display state, the third control switch 29 and the second control switches 26 and 27 are turned on and the first control switch 25 is turned off, and hence the same voltage is provided as the common voltage to the touch sensing electrodes from the first common electrode wiring 28 through the second control switches 26 and 27 and a display signal is provided to each sub-pixel 23 from the data line through the third control switch 29. When the touch display panel is in the touch state, the third control switch 29 and the second control switches 26 and 27 are turned off and the first control switch 25 is turned on, so that the touch signal is provided to the touch sensing electrode 24 from the data line through the first control switch 25. The touch display panel shown in FIG. 4 is different from that shown in FIG. 3A in that the adjacent touch sensing electrodes 24 located at the center region of the touch display panel are connected through the second control switch 27 in such a way that all touch sensing electrodes of the touch display panel have the same electric potential, thereby ensuring that the voltages applied to the touch sensing electrodes are uniform when the touch display panel is in the touch sensing phase.

Further, the first control switch is embodied as a P-type transistor, and the second control switch and the third control switch are embodied as N-type transistors. Alternatively, the first control switch is embodied as an N-type transistor, and the second control switch and the third control switch are embodied as P-type transistors. The specific types of the first control switch, the second control switch and the third control switch can be changed depending on the specific parameters of the touch display panel.

Figure 5A:
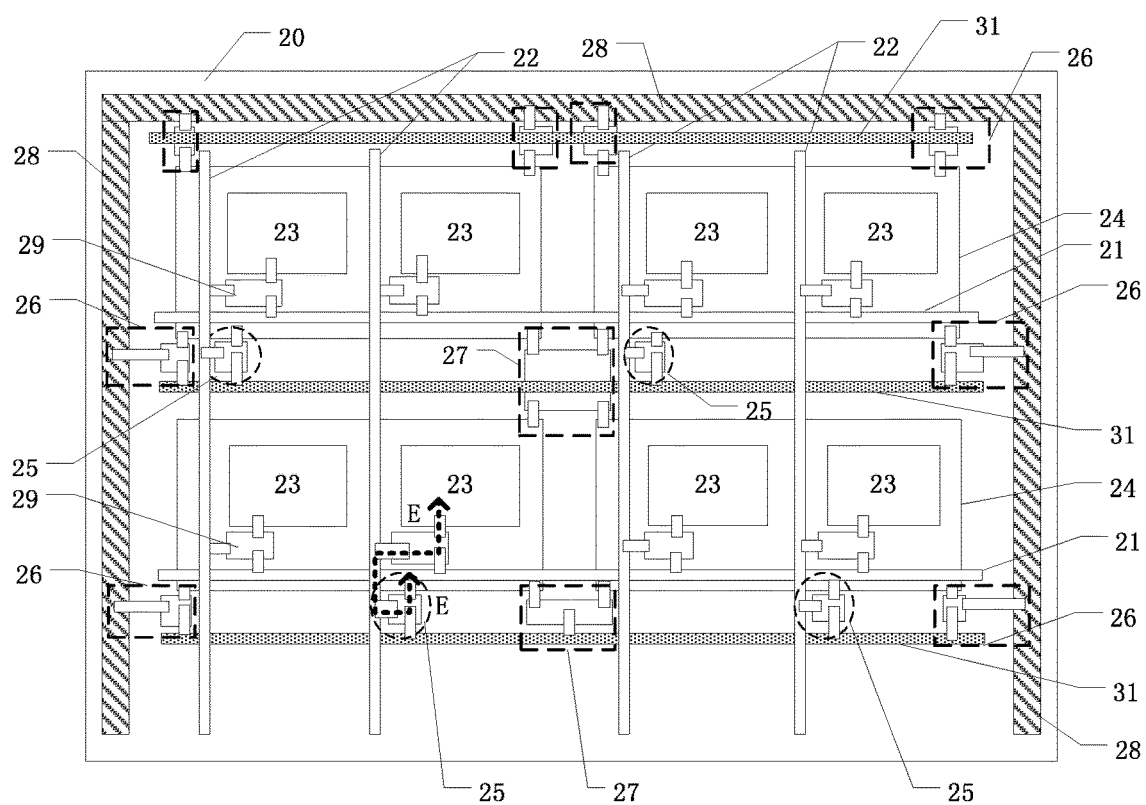
FIG. 5A is a schematic diagram showing the structure of a further touch display panel, according to embodiments of the disclosure.

FIG. 5A is a schematic diagram showing the structure of a touch display panel, according to embodiments of the disclosure. As shown in FIG. 5A, in addition to those parts as shown in FIG. 4 described above, the touch display panel includes second scan lines 31, each of which is connected with the first control switch 25 and the second control switches 26 and 27, for enabling the first control switch 25 to be turned on and the second control switches 26 and 27 to be turned off, or alternatively enabling the first control switch 25 to be turned off and the second control switches 26 and 27 to be turned on. The first scan line 21 is connected with the third control switch 29. By means of the turning-on signals (i.e. control signals) from the second scan line 31, the first control switch 25 and the second control switches 26 and 27 are controlled to alternately turn on and off. Moreover, to ensure that a turning-on condition of the first control switch 25 is opposite to that of the second control switches 26 and 27, the first control switch 25 and the second control switches 26 and 27 are embodied as different types of transistors. For example, the first control switch 25 is embodied as a P-type transistor, and the second control switches 26 and 27 are embodied as N-type transistors.

Figure 5B:
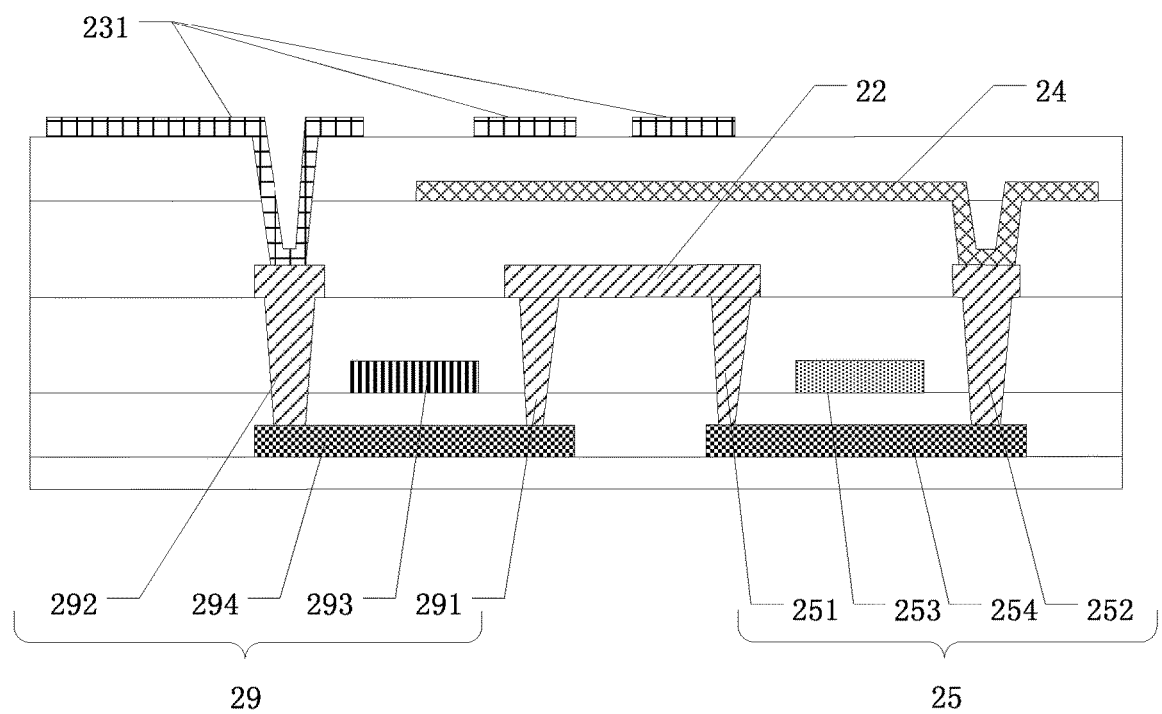
FIG. 5B is a cross-sectional view of the touch display panel along a line E-E in FIG. 5A.

FIG. 5B is a cross-sectional view of the touch display panel along a line E-E in FIG. 5A. As shown in FIG. 5B, the third control switch 29 as a TFT includes a source electrode 291, a drain electrode 292, a gate electrode 293 and a semiconductor layer 294. The source electrode 291 of the third control switch 29 is connected to the data line 22, the drain electrode 292 of the third control switch 29 is connected to the pixel electrode 231 of the sub-pixel 23, and the gate electrode 293 of the third control switch 29 is connected to the first scan line 21. The first control switch 25 includes a source electrode 251, a drain electrode 252, a gate electrode 253 and a semiconductor layer 254. The source electrode 251 of the first control switch 25 is connected to the data line 22, the drain electrode 252 of the first control switch 25 is connected to the touch sensing electrode 24, and the gate electrode 253 of the first control switch 25 is connected to the second scan line 31. Illustratively, the first control switch 25 and the third control switch 29 are shown in FIG. 5B to have a top-gate TFT structure, but the disclosure is not limited thereto. In other embodiments, the first control switch and the third control switch may alternatively have a bottom-gate TFT structure.

The first control switch 25 and/or the third control switch 29 may have an LTPS-TFT structure, i.e. the semiconductor layer 254 of the first control switch 25 and the semiconductor layer 294 of the third control switch 29 are made of poly silicon, so that the first control switch 25 and the third control switch 29 have a fast response speed. An amorphous silicon film may be transformed into a poly silicon film by an Excimer Laser Annealing process, a Metal optimization Crystallization process or a Solid Phase Crystallization process. The semiconductor layer 294 may be made of oxide semiconductor or amorphous silicon.

It is noted that the source electrode 251 and the drain electrode 252 of the first control switch 25 are exchangeable, and the source electrode 291 and the drain electrode 292 of the third control switch 29 are exchangeable, i.e. it is alternatively possible that the source electrode 251 of the first control switch 25 is connected to the touch sensing electrode 24, the drain electrode 252 of the first control switch 25 is connected to the data line 22, the source electrode 291 of the first control switch 29 is connected to the pixel electrode 231 of the sub-pixel 23, and the drain electrode 292 of the third control switch 29 is connected to the data line 22.

In embodiments, the first scan line 21 is connected with the third control switch 29 in order to control the turning on and off of the third control switch 29; and the second scan line 31 is connected with the first control switch 25 and the second control switches 26 and 27 so that the first control switch 25 and the second control switches 26 and 27 are alternatively turned on or off under the control of the turning-on signals (i.e. control signals) from the second scan line 31, thereby avoiding the current leakage caused by the delay of the first control switch, the second control switches and the third switch all controlled by the same signal line (for example the first scan line).

It is noted that the source electrodes and the drain electrodes of the first control switch, the second control switches and the third control switch may be formed by the metal layer forming the data lines and/or the first scan lines.

In addition, the second scan line may be electrically connected with the first common electrode wiring, so that a voltage signal is received from the first common electrode wiring by the second scan line as a turning-on signal to correspondingly control the turning on and off of the first control switch and the second control switches.

In order to reduce the processes, improve production efficiency and decrease the cost, the second scan line is disposed in the same layer as the first scan line, and the second scan line and the first scan line are manufactured in the same process and made of the same material.

The first common electrode wiring is provided at the periphery of the display region of the substrate without occupying the display region, thereby not only simplifying the structure of the display region but also improving the display quality of the touch display panel.

Further, the first common electrode wiring is disposed in the same layer as the data line or the first scan line (illustratively in FIG. 3C, the first common electrode wiring is in the same layer as the data line) in order to reduce the processes for manufacturing the touch display panel, thereby decreasing the cost of the touch display panel.

Figure 7:
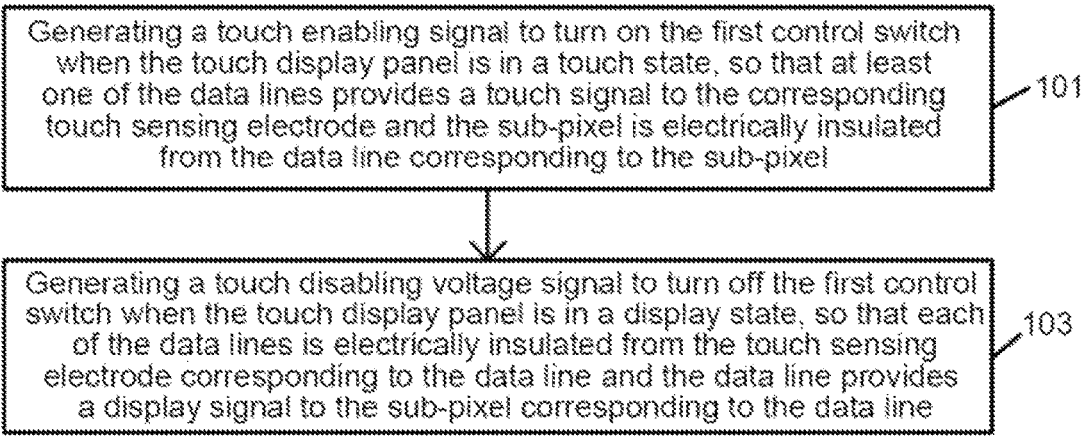
FIGS. 7 and 8 are flow charts of a method for driving a touch display panel, according to embodiments of the disclosure.

Embodiments of the disclosure provide a method for driving a touch display panel. The touch display panel includes: a substrate; a plurality of first scan lines and a plurality of data lines disposed on the substrate; a plurality of sub-pixels arranged in an array, which are defined by the data lines and the scan lines insulatedly intersecting the data lines; a plurality of touch sensing electrodes disposed in an array, each of which corresponds to a plurality of the sub-pixels; and a plurality of first control switches, where each of the touch sensing electrodes is connected to at least one of the data lines via a corresponding first control switch. As illustrated in FIG. 7, the method includes: Step (101) for generating a touch enabling signal to turn on the first control switch when the touch display panel is in a touch state, so that at least one of the data lines provides a touch signal to the corresponding touch sensing electrode and the sub-pixel is electrically insulated from the data line corresponding to the sub-pixel; and Step (102) for generating a touch disabling voltage signal to turn off the first control switch when the touch display panel is in a display state, so that each of the data lines is electrically insulated from the touch sensing electrode corresponding to the data line and the data line provides a display signal to the sub-pixel corresponding to the data line.

As such, in embodiments of the disclosure, the touch sensing electrode is electrically connected with the corresponding data line by the first control switch. When the touch display panel is in a touch state, the first control switch is turned on so that a touch signal (e.g. a touch driving signal) is provided to the corresponding touch sensing electrode via the data line; and when the touch display panel is in a display state, the first control switch is turned off so that a display signal is provided to the corresponding sub-pixel via the data line. In this configuration, the existing data line is utilized to provide the touch signal to the touch sensing electrode, without adding additional wirings to the display region, thereby not only reducing the processes of manufacturing the touch display panel to lower the cost of the touch display panel, but also improving planarization of the sub-pixel region to decrease the risk of light leakage. Additionally, the data line is utilized to provide the touch signal to the touch sensing electrode during the touch sensing phase and provide the display signal to the sub-pixel during the display phase, so that the touch sensing electrode is not limited by the size of the touch display panel. Furthermore, since additional metal wiring for providing the touch signal is eliminated, pins of the drive chip may also be reduced.

In a method for driving the touch display panel, according to embodiments of the disclosure, there are various driving ways of implementing that the data line of the touch display panel is utilized to provide the touch signal during the touch sensing phase and provide the display signal during the display phase. Some embodiments of these ways are described in detail below.

In embodiments of the disclosure, the touch display panel further includes a common electrode, which may or may not be reused as the touch sensing electrodes. In the case that the common electrode of the touch display panel is not reused as the touch sensing electrodes, the method includes:

generating a touch disabling voltage signal to turn off the first control switch when the touch display panel is in a display state, so that each of the data lines is electrically insulated from the touch sensing electrode corresponding to the data line, and a display signal is provided via the data line to the sub-pixel corresponding to the data line, and in this case, a common voltage is provided to the common electrode via an external common voltage line to achieve a display function; and generating a touch enabling signal to turn on the first control switch when the touch display panel is in a touch state, so that at least one of the data lines provides a touch signal to the touch sensing electrode corresponding to the data line and the sub-pixel is electrically insulated from the data line corresponding to the sub-pixel, and in this case, no common voltage signal is provided, so as to achieve a touch sensing function.

Figure 8:
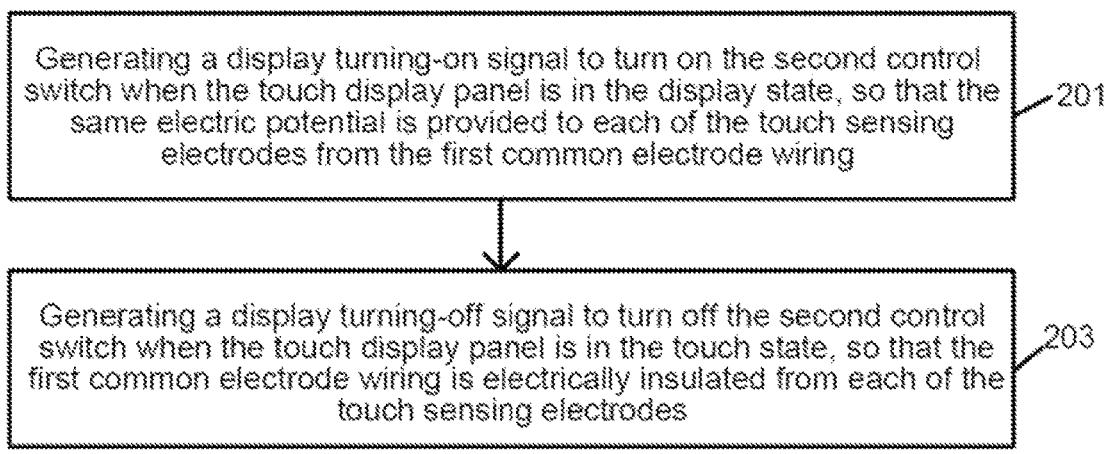

In the case that the common electrode of the touch display panel can be reused as the touch sensing electrodes, the common electrode of the touch display panel includes a plurality of touch sensing electrodes which are obtained by dividing the common electrode. In such structure of the touch display panel, a touch signal is provided to the touch sensing electrode in the touch state and a common voltage signal is provided to the touch sensing electrode in the display state. Since the common electrode includes a plurality of touch sensing electrodes, the same voltage is provided as the common voltage to all the touch sensing electrodes in the display state. Therefore, in embodiments of the disclosure, a second control switch and a first common electrode wiring are provided in the touch display panel, and each of the touch sensing electrodes is connected to the first common electrode wiring by the second control switch. At least a portion of the second control switches are connected between the touch sensing electrodes and the first common electrode wiring, and at least another portion of the second control switches are connected between at least two adjacent touch sensing electrodes. The number and positions of the second control switches are not limited in the embodiments of the disclosure, as long as it is ensured that each of the touch sensing electrodes is connected to the first common electrode wiring by at least one of the second control switches. As illustrated in FIG. 8, the method for driving the touch display panel of such structure includes:

Step 201: generating a display turning-on signal to turn on the second control switch when the touch display panel is in the display state, so that the same electric potential is provided to each of the touch sensing electrodes from the first common electrode wiring; and Step 203: generating a display turning-off signal to turn off the second control switch when the touch display panel is in the touch state, so that the first common electrode wiring is electrically insulated from each of the touch sensing electrodes.

It is noted that the control signals for the first control switch and the second control switch can be provided from the same signal line or different signal lines. In the case that the control signals for the first control switch and the second control switch are provided from the same signal line, it is configured that the turning-on condition of the first control switch is opposite to that of the second control switch in order to turn on the second control switch when the touch display panel is in the display state and to turn off the second control switch when the touch display panel is in the touch state. In the case that the control signals for the first control switch and the second control switch are provided from different signal lines, it is configured the turning-on condition of the first control switch is the same as or opposite to that of the second control switch.

Furthermore, in the display state, the display signal is provided to each sub-pixel. In embodiments of the disclosure, at least one third control switch is disposed in each sub-pixel and it is configured that the turning-on condition of the third control switch is the same as that of the second control switch. Accordingly, the method includes that:

when the touch display panel is in the display state, the second control switch and the third control switch are turned on, so that the first common electrode wiring provides the same electric potential to each of the touch sensing electrodes through the second control switch, and the data line provides the display signal to the sub-pixel corresponding to the data line through the third control switch, and when the touch display panel is in the touch state, the second control switch and the third control switch are turned off, so that the first common electrode wiring is electrically insulated from each of the touch sensing electrodes and the data line is electrically insulated from the sub-pixel corresponding to the data line.

It is noted that there are various ways of implementing that the control signals are provided to the first control switch, the second control switch and the third control switch through various signal lines. For example, in embodiments of the disclosure, the touch display panel is provided with the second scan lines, the control terminals of the first control switch and the second control switch are electrically connected to the corresponding second scan lines, respectively, so that the touch enabling signal and the touch disabling signal can be inputted through the corresponding second scan lines to turn on and off the first control switch and the second control switch; and the control terminal of the third control switch is electrically connected to the corresponding first scan line, so that the display turning-on signal and the display turning-off signal can be inputted through the corresponding first scan line to turn on and off the third control switch. For example, the second scan line is electrically connected with the first common electrode wiring to receive a voltage signal from the first common electrode wiring as a turning-on signal for the first control switch and the second control switch.

In order to reduce the processes for manufacturing the touch display panel and decrease the cost, the second scan line can be disposed in the same layer as the first scan line, and furthermore, the first common electrode wiring can be provided at the periphery of a display region on the substrate and can be formed in the same layer as the data line or the first scan line.

Figure 6:
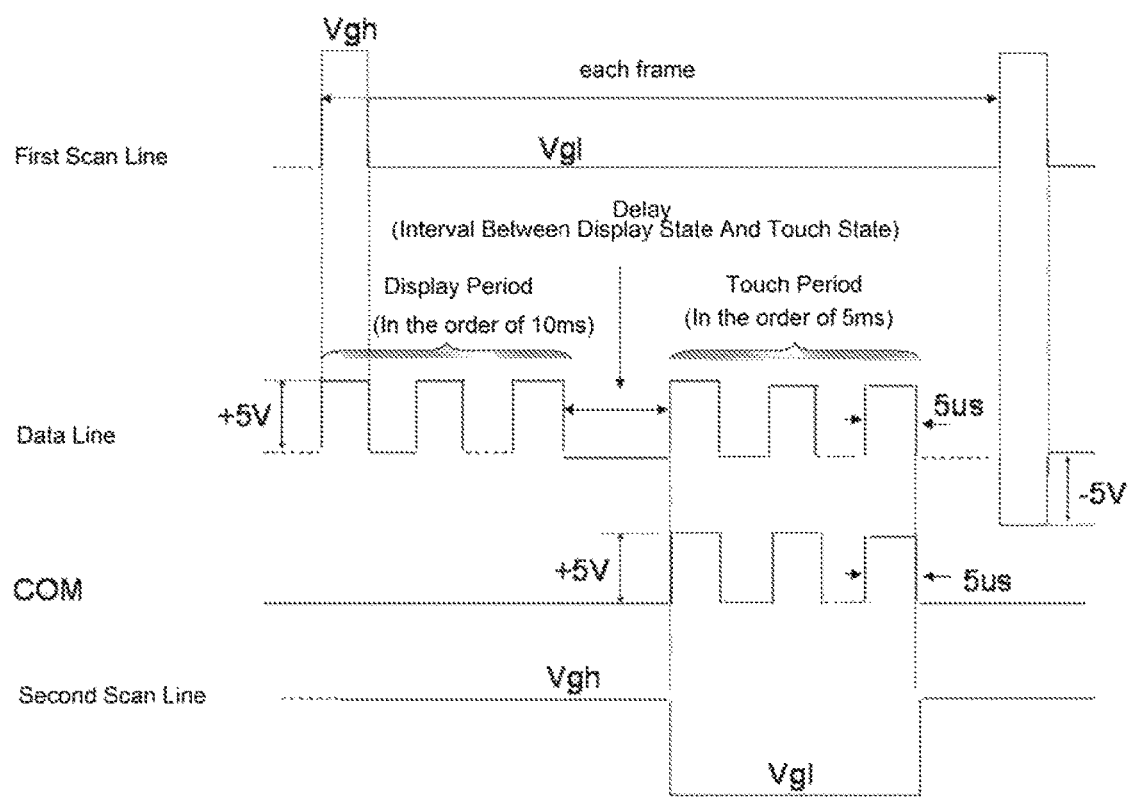
FIG. 6 is a driving timing diagram of a touch display panel, according to embodiments of the disclosure.

FIG. 6 is a driving timing diagram of a touch display panel, according to embodiments of the disclosure. Illustratively, for ease of description, the first control switch is shown in FIG. 6 as a P-type transistor, and the second control switch and the third control switch both are shown in FIG. 6 as N-type transistors. The structural diagram of the touch display panel is shown in FIG. 5A. Referring to FIG. 6, each frame includes a display period and a touch period. When the touch display panel is in the display state (i.e. in the display period), a high level signal Vgh is input to the second scan line 31, so that the first control switch 25 is turned off and hence the data line 22 is electrically insulated from the touch sensing electrode 24, and the second control switches 26 and 27 are turned on so that the same electric potential Vcom is provided to each of the touch sensing electrodes 24 from the first common electrode wiring 28. A high level signal Vgh is input to the first scan line 21, so that the third control switch 29 is turned on, and hence the display signal is provided from the data line 22 to charge the sub-pixel 23, where the display period is illustratively shown in the order of 10 ms. After all the sub-pixels of the touch display panel have been charged to complete the frame displaying, the touch display panel enters in the touch state, i.e. in the touch period. When the touch display panel is in the touch state, a low level signal Vgl is input to the second scan line 31, so that the first control switch 25 is turned on and hence the touch signal is provided to the touch sensing electrode 24 through the data line 22, where the touch period is illustratively shown in the order of 5 ms; and the second control switches 26 and 27 are turned off and hence the first common electrode wiring 28 is electrically insulated from each of the touch sensing electrodes 24. A low level signal Vgl is input to the first scan line 21, so that the third control switch 29 is turned off, and hence the data line 22 is electrically insulated from the sub-pixel 23. At this point, the electric potential (such as 2V and 5V in the touch state) of the touch sensing electrodes 24 in the touch state is higher than that of the touch sensing electrodes 24 in the display state. When each frame is finished and the next frame begins, the touch display panel enters in the display state again and the above alternating processes are repeated, which is not discussed again hereinafter.

Figure 1B:
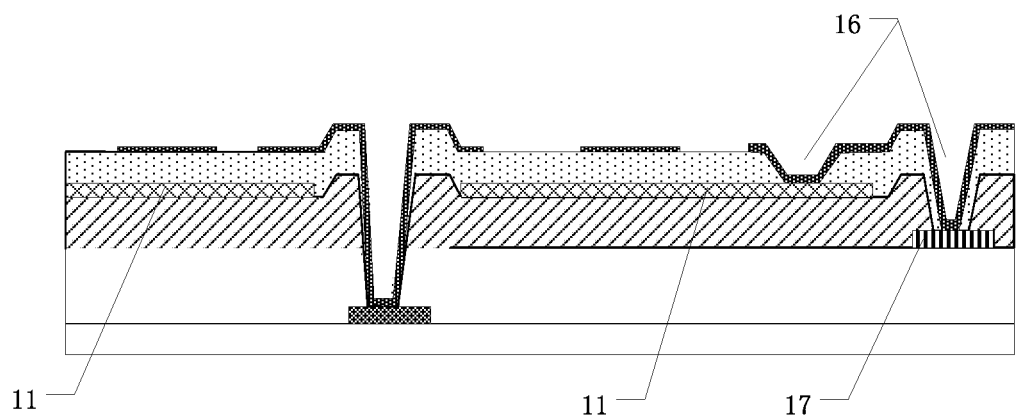
FIG. 1B is a cross-sectional view of the touch display panel along a line A-A in FIG. 1A.

In the disclosure, when the touch display panel is in the touch state, the touch signal required by the touch sensing electrode 24 is provided by the data line 22; and when the touch display panel is in the display state, the voltage signal required by the touch sensing electrode 24 functioning as the common electrode is provided by the first common electrode wiring 28 disposed at the periphery of the display region, which is implemented by the switching of the first control switch 25 and the second control switches 26 and 27 in a time division manner. In the touch display panel, according to embodiments of the disclosure, the existing data lines 22 are utilized to provide the touch signals to the touch sensing electrodes 24 without other additional wirings (such as the metal wiring 17 shown in FIGS. 1A and 1B), thereby not only reducing the processes for manufacturing the touch display panel to decrease the cost of the touch display panel, but also improving planarization of the sub-pixel region to decrease the risk of light leakage.

Additionally, with the method, according to embodiments of the disclosure, since the electric potential of the data line 22 is substantially equal to that of the touch sensing electrode 24 in the touch state, the parasitic capacitance between the data line 22 and the touch sensing electrode 24 is substantially eliminated, so that a waveform of the voltage on the touch sensing electrode 24 is optimized, thereby improving sensitivity of the touch display panel.

Illustratively, in the timing diagram shown in FIG. 6, a delay is provided between the display period and the touch period, i.e. an interval is provided between the display state and the touch state in each frame, but embodiments of the disclosure are not limited thereto. In an actual application, the display period, the touch period and the presence of the interval between the display period and the touch period depend on parameters such as a scan frequency of the touch display panel and a scan time for each frame.

When the display device is powered off, residual charges are usually remained on the common electrode and the sub-pixels, leading to generation of the residual image upon the powering-off of the display device. Furthermore, if these charges cannot be completely eliminated before the display device is activated next time, a flicker phenomenon would occur to the touch display panel after the display device is powered on. However, in the touch display panel shown in FIG. 5A and the method, according to embodiments of the disclosure, since the first control switch is provided and connected with the touch sensing electrode and the third control switch is connected with the sub-pixel, the turning-on voltage signal is generated when the touch display panel is powered off, and is provided to the first scan line 21 and the second scan line 31 so that the first control switch 25 and the second control switches 26 and 27 are turned on, causing a short circuit between the touch sensing electrode 24 and the sub-pixels 23, thereby directly releasing the residual charges remained on the touch sensing electrode 24 and the sub-pixels 23 and avoiding the generation of the residual image when the display device is powered off and the generation of the flicker phenomenon when the display is activated next time, and thus improving the display quality of the touch display panel.

It should be noted that the above description describes embodiments and technical principles of the disclosure. Those skilled in this art will understand that the disclosure is not limited to the specific embodiments described herein, and various apparent changes, rearrangements and substitutions may be made by those skilled in this art without departing from the protecting scope of the disclosure. Therefore, although the disclosure has been described in detail as above in connection with the embodiments, the disclosure is not limited thereto and may include other equivalent embodiments without departing from the scope of the disclosure. However, the protection scope of the disclosure is defined by the appended claims.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. A touch display panel, comprising:
   a substrate;
   a plurality of first scan lines and a plurality of data lines both disposed on the substrate;
   a plurality of sub-pixels arranged in an array, which are defined by the data lines and the first scan lines which are insulated from and intersect the data lines;
   a plurality of touch sensing electrodes disposed in an array, each of which corresponds to a plurality of the sub-pixels;
   a plurality of first control switches, wherein each of the touch sensing electrodes is connected to at least one of the data lines via the first control switches;
   a plurality of second control switches and a first common electrode wiring disposed on the substrate, and each of the touch sensing electrodes is connected to the first common electrode wiring by at least one of the second control switches; and
   a plurality of second scan lines disposed on the substrate, and each of the second scan lines is connected to a control terminal of the first control switch and a control terminal of the second control switch, and is configured for controlling the first control switch to be turned on or off and the second control switch to be turned on or off;
   wherein each of the second scan lines is connected to the first common electrode wiring to receive a voltage signal from the first common electrode wiring, and the voltage signal serves as a turning-on signal for the first control switch and the second control switch;
   when the touch display panel being in a touch state, the first control switch is turned on, so that the at least one of the data lines is configured to provide a touch signal to the touch sensing electrode corresponding to the at least one of the data lines, and the second control switch is turned off, so that the first common electrode wiring is electrically insulated from each of the touch sensing electrodes; and
   when the touch display panel being in a display state, the first control switch is turned off, so that each of the data lines is configured to provide a display signal to the sub-pixel corresponding to the data line, and the second control switch is turned on, so that the first common electrode wiring is configured to provide the same electric potential to each of the touch sensing electrodes.

2. The touch display panel of claim 1, wherein a turned-on condition of the first control switch is opposite to that of the second control switch.

3. The touch display panel of claim 2, wherein each of the sub-pixels comprises at least one third control switch, and a turned-on condition of the third control switch is the same as that of the second control switch.

4. The touch display panel of claim 3, wherein the first control switch is a P-type transistor, and both the second control switch and the third control switch are N-type transistors.

5. The touch display panel of claim 3, wherein the first control switch is an N-type transistor, and both the second control switch and the third control switch are P-type transistors.

6. The touch display panel of claim 1, wherein the second scan line is disposed in the same layer as the first scan line.

7. The touch display panel of claim 1, wherein the first common electrode wiring is provided at periphery of a display region on the substrate and is formed in the same layer as the data lines or the first scan line.

8. The touch display panel of claim 7, wherein at least a portion of the second control switches are connected between the touch sensing electrode and the first common electrode wiring, and at least another portion of the second control switches are connected between at least adjacent two of the touch sensing electrodes.

9. The touch display panel of claim 1, wherein a common electrode is further disposed on the substrate, and comprises a plurality of the touch sensing electrodes.

10. A method for driving a touch display panel, comprising:
   when the touch display panel is in a touch state, generating a touch enabling signal to turn on the first control switch, so that the at least one of the data lines provides a touch signal to the touch sensing electrode corresponding to the at least one of the data lines and the sub-pixel is electrically insulated from the data line corresponding to the sub-pixel, and generating a display turning-off signal to turn off the second control switch so that the first common electrode wiring is electrically insulated from each of the touch sensing electrodes; and
   when the touch display panel is in a display state, generating a touch disabling voltage signal to turn off the first control switch, so that each of the data lines is electrically insulated from the touch sensing electrode corresponding to the data line and the data line provides a display signal to the sub-pixel corresponding to the data line, and generating a display turning-on signal to turn on the second control switch so that the first common electrode wiring provides the same electric potential to each of the touch sensing electrodes;
   wherein the touch display panel comprises:
   a substrate;
   a plurality of first scan lines and a plurality of data lines both disposed on the substrate;
   a plurality of sub-pixels arranged in an array, which are defined by the data lines and the first scan lines which are insulated from and intersect the data lines;
   a plurality of touch sensing electrodes disposed in an array, each of which corresponds to a plurality of the sub-pixels;
   a plurality of first control switches, wherein each of the touch sensing electrodes is connected to at least one of the data lines via the first control switches;
   a plurality of second control switches and a first common electrode wiring are further disposed on the substrate; and each of the touch sensing electrodes is connected to the first common electrode wiring by at least one of the second control switches; and
   a plurality of second scan lines disposed on the substrate, a control terminal of the first control switch and a control terminal of the second control switch are connected to corresponding one of the second scan lines, and the touch enabling signal and the touch disabling signal are inputted through the second scan line to control the first control switch to be turned on or off and the second control switch to be turned on or off;
   wherein each of the second scan lines is connected to the first common electrode wiring to receive a voltage signal from the first common electrode wiring, and the voltage signal serves as a turning-on signal for the first control switch and the second control switch.

11. The method of claim 10, wherein a turned-on condition of the first control switch is opposite to that of the second control switch.

12. The method of claim 11, wherein each of the sub-pixel comprises at least one third control switch, and a turned-on condition of the third control switch is the same as that of the second control switch; when the touch display panel being in the display state, the second control switch and the third control switch are turned on, so that the first common electrode wiring provides the same electric potential to each of the touch sensing electrodes through the second control switch, and data line provides the display signal to the sub-pixel corresponding to the data line through the third control switch, and when the touch display panel being in the touch state, the second control switch and the third control switch are turned off, so that the first common electrode wiring is electrically insulated from each of the touch sensing electrodes and the data line is electrically insulated from the sub-pixel corresponding to the data line.

13. The method of claim 12, wherein a control terminal of the third control switch is electrically connected to the corresponding first scan line, and the display turning-on signal and the display turning-off signal are inputted through the first scan line to turn on or off the third control switch.

14. The method of claim 13, wherein the second scan line is disposed in the same layer as the first scan line.

15. The method of claim 13, further comprising:
when the touch display panel is powered off, generating and inputting a turning-on voltage signal to the first scan line and the second scan line to turn on the first control switch and the third control switch, so that the touch sensing electrode and the sub-pixel are discharged via the data line.

16. The method of claim 10, wherein the first common electrode wiring is provided at periphery of a display region on the substrate and formed in the same layer as the data lines or the first scan line.

17. The method of claim 16, wherein at least a portion of the second control switches are connected between the touch sensing electrode and the first common electrode wiring, and at least another portion of the second control switches are connected between at least adjacent two of the touch sensing electrodes.

18. The method of claim 10, wherein a common electrode comprising a plurality of the touch sensing electrodes are further disposed on the substrate.

* * * * *